(12) United States Patent
Reimann et al.

(10) Patent No.: US 11,959,547 B2
(45) Date of Patent: Apr. 16, 2024

(54) SENSOR ARRANGEMENT FOR AN AUTOMATED TRANSMISSION AND METHOD FOR DETECTING A MAGNETIC INTERFERENCE FIELD

(71) Applicant: ZF CV Systems Global GmbH, Bern (CH)

(72) Inventors: Dennis Reimann, Hannover (DE); Stefan Groetzinger, Gehrden (DE); Robert Sohn, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/030,608

(22) PCT Filed: Sep. 27, 2021

(86) PCT No.: PCT/EP2021/076443
§ 371 (c)(1),
(2) Date: Apr. 6, 2023

(87) PCT Pub. No.: WO2022/073779
PCT Pub. Date: Apr. 14, 2022

(65) Prior Publication Data
US 2023/0366462 A1    Nov. 16, 2023

(30) Foreign Application Priority Data
Oct. 7, 2020  (DE) ..................... 10 2020 126 169.1

(51) Int. Cl.
*F16H 61/12* (2010.01)
*F16H 63/24* (2006.01)

(52) U.S. Cl.
CPC ............. *F16H 61/12* (2013.01); *F16H 63/24* (2013.01); *F16H 2061/1232* (2013.01); *F16H 2061/1244* (2013.01); *F16H 2061/1284* (2013.01)

(58) Field of Classification Search
CPC .. F16H 61/12; F16H 63/24; F16H 2061/1232; F16H 2061/1244; F16H 2061/1284
See application file for complete search history.

(56) References Cited

U.S. PATENT DOCUMENTS

2001/0003250 A1\* 6/2001 Ogami .................... F16H 61/12
74/335

FOREIGN PATENT DOCUMENTS

| CN | 106641237 A | 5/2017 | |
| CN | 107514459 A | \* 12/2017 | ............. F16H 63/30 |

(Continued)

OTHER PUBLICATIONS

European Patent Office, Rijswijk, Netherlands, International Search Report of International Application No. PCT/EP2021/076443, dated Dec. 10, 2021, 2 pages.

(Continued)

*Primary Examiner* — Justin Holmes
(74) *Attorney, Agent, or Firm* — Dickinson Wright PLLC (57) ABSTRACT

A sensor arrangement (46) for an automated transmission includes multiple axially parallel shift rails (4, 14, 24, 34) being axially displaceable by associated shift actuators (8, 18, 28, 38). The sensor arrangement (46) has multiple displacement sensors (48, 56, 64, 72) made up of a signal transmitter (50, 58, 66, 74) attached to a shift rail and a signal receiver (52, 60, 68, 76) fixedly arranged on a housing. The signal transmitters are in the form of a permanent magnet, and the signal receivers are in the form of a 3D Hall sensor. To detect an external magnetic interference (Continued)

field, which can corrupt the sensor signals from the displacement sensors (48, 56, 64, 72), the signal transmitters (50, 58, 66, 74) have identical axial alignments of their magnetic poles, and the signal receivers (52, 60, 68, 76) are in a common plane (80) that is horizontal in their installation position.

19 Claims, 4 Drawing Sheets

(56) References Cited

FOREIGN PATENT DOCUMENTS

| | | | | |
|---|---|---|---|---|
| DE | 102004052797 A1 | 5/2006 | | |
| DE | 102005015482 A1 | 10/2006 | | |
| DE | 102006011207 A1 | 9/2007 | | |
| DE | 102014010601 A1 | 1/2016 | | |
| DE | 102017202833 A1 * | 8/2018 | ........... | F16H 59/044 |
| DE | 102017002873 A1 | 9/2018 | | |
| EP | 3336386 A1 * | 6/2018 | ........... | B60W 10/04 |
| EP | 3670972 A1 | 6/2020 | | |
| WO | 2010020472 A1 | 2/2010 | | |
| WO | WO-2017129382 A1 * | 8/2017 | ......... | F16H 61/0009 |
| WO | WO-2018172323 A1 * | 9/2018 | ........... | F16H 59/105 |

OTHER PUBLICATIONS

Norm ISO 11452-8 01.0-2-15. Road vehicles—Component test methods for electrical disturbances from narrowband radiated electromagnetic energy—Part 8: Immunity to magnetic fields. S. 1-17.

\* cited by examiner

Fig.1

SENSOR ARRANGEMENT FOR AN AUTOMATED TRANSMISSION AND METHOD FOR DETECTING A MAGNETIC INTERFERENCE FIELD

FIELD

The present disclosure relates to a sensor arrangement for an automated transmission, which has a shifting device that includes multiple shift rails, which are arranged so as to be axially parallel to one another and are axially displaceable by way of associated shift actuators, wherein the sensor arrangement has multiple displacement sensors, each of which is made up of a signal transmitter attached to one of the shift rails and a signal receiver fixedly arranged on a housing, wherein the signal transmitters are each in the form of a permanent magnet, wherein the signal receivers are each in the form of a 3D Hall sensor, and in which the signal receivers are connected to an electronic transmission control unit via electrical sensor lines. The present disclosure also relates to a method for detecting an external magnetic interference field by way of a sensor arrangement of this type.

BACKGROUND

Vehicle transmissions of a countershaft design have at least two axially parallel transmission shafts, for example, a countershaft and a main shaft, which are drivingly coupleable to each other via multiple gear sets having different ratios. The gear sets include at least one fixed gear arranged on the one transmission shaft in a rotationally fixed manner and an idler gear rotatably mounted on the other transmission shaft, which are in meshing engagement with each other or via an intermediate gear. The fixed gears and the idler gears are usually arranged in pairs on the one or the other transmission shaft. A gear shift sleeve, which has selector teeth arranged on both sides and is mounted so as to be rotationally fixed and axially displaceable, is arranged in each case on the relevant transmission shaft between the idler gears of two adjacent gear sets. One of the two gear sets in this example is connected and, thereby, the relevant gear stage is engaged due to the fact that the gear shift sleeve is displaced axially towards the idler gear of the relevant gear set and, thereby, selector teeth of the gear shift sleeve are brought into engagement with a corresponding mating toothing of the idler gear. The release of the engagement of the gear set and, thereby, the disengagement of the relevant gear stage takes place due to an axial displacement of the gear shift sleeve in the opposite direction into a neutral position in the middle. The gear shift clutches of the gear sets, including the selector teeth and the mating toothing, can be designed as unsynchronized dog clutches or as friction-synchronized synchronous clutches.

In order to shift the gear stages, a transmission-internal shifting device usually includes multiple shift rails, which are arranged so as to be axially parallel to the aforementioned transmission shafts, and multiple shift forks or forked shift rockers, each of which is pivotable about a transverse axis and engages into an outer annular groove of one of the gear shift sleeves. In a two-stage transmission, such as, for example, a splitter group or a range change group of a group transmission, a shift fork is fixedly connected to an associated shift rail or a shift rocker is permanently form-lockingly coupled to an associated shift rail. In a transmission that has more than two gear stages, such as, for example, a main transmission of a group transmission, multiple shift rails can be provided, each of which is fixedly connected to a shift fork or is in an actuating connection with a shift rocker.

In a manually shiftable transmission, the shift rails are in an actuating connection with a gear shift lever via a linkage or control cable device, the gear shift lever being arranged in the driver's cab of a vehicle and is manually actuatable by a driver. By comparison, in a transmission that is shiftable in an automated manner, the shift rails are axially displaceable by way of associated shift actuators, having been triggered by an electronic transmission control unit. For this purpose, it is necessary to ascertain the particular shift position or selector position of the shift rails by way of associated displacement sensors and to transmit the particular shift position or selector position to the transmission control unit. The displacement sensors used are preferably Hall sensors, which, in comparison to other types of sensors, such as optical sensors or ultrasonic sensors, are particularly low-interference and robust against environmental influences, such as oil, spray water, and dirt deposits.

DE 10 2005 015 482 A1 describes a shifting device of an automated transmission that includes four shift rails arranged so as to be axially parallel to one another and to a transmission shaft. The transmission has a main transmission that includes four gear stages, a two-stage splitter group connected upstream from the main transmission, and a two-stage range change group connected downstream from the main transmission. One shift rail is associated with the splitter group and one shift rail is associated with the range change group, the axial displacement of which enables the shift between the two gear stages of the splitter group or the two gear stages of the range change group. Two shift rails are associated with the main transmission, the selective axial displacement of which in one direction or in the other direction enables a change-over in each case between two shift positions, in each of which one of the two gear stages is engaged, and a neutral position situated between these two gear stages, both gear stages being disengaged in the neutral position. Four shift actuators are present for axially displacing the shift rails, the shift actuators being designed as hydraulic or pneumatic piston-cylinder arrangements and arranged at an axial end of the shift rails in a common housing.

A typical design and arrangement of a displacement sensor in a shifting device of a transmission, the displacement sensor being made up of a signal transmitter in the form of a permanent magnet and attached to a shift rail and a signal receiver in the form of a 3D Hall sensor and arranged in a housing cover, are known from DE 2017 002 873 A1. In contrast to a simple Hall sensor, in the case of a 3D Hall sensor, at least three Hall sensors are arranged on an electronic chip, each one being aligned in a different spatial direction, as the result of which the magnetic field of the associated permanent magnet is ascertainable in three dimensions.

According to the ISO 11452-8 standard, Hall sensors are to have a robustness to magnetic interference fields having a strength or magnetic flux density of up to 4 mT. This suffices under normal operating conditions of a vehicle, because the magnetic field of a permanent magnet used as a signal transmitter, which is detected by a Hall sensor, has a magnetic flux density in the range from 20 mT to 100 mT. There are a few areas of application, however, in which a vehicle can enter the range of a stronger external magnetic interference field having a magnetic flux density of up to 25 mT, due to which the sensor-based determination of the shift positions of an automated transmission is disturbed. This type of situation can arise, for example, in factories, such as aluminum smelters, in which heavy-current cables surrounded by strong magnetic fields can be arranged in the floor or at lateral walls of loading facilities. This similarly affects scrap loading points at scrap yards and in the proximity of railway stations, where cranes are used that have lifting magnets surrounded by strong magnetic fields.

It is in fact generally known that an electronic unit can be completely shielded against an external magnetic interference field by being arranged in a ferromagnetic hollow body. However, such a shielding, which is made up, for example, of ferromagnetic shield plates, is relatively complex, usually difficult to implement, and often requires a large installation space.

Another possibility is to provide a sensor of this type for ascertaining an external magnetic interference field, which is remote from the magnetic fields of the permanent magnets used as signal transmitters. When a magnetic interference field is detected, this can be taken into account in a suitable way in the control of an automated transmission. However, this requires a greater amount of equipment and control.

An appropriate sensor arrangement for an actuating device, with which the position of a permanent magnet along a movement path is detected by a first magnetic field sensor (Hall sensor) and magnetic interference effects on the first magnetic field sensor are detected by a second magnetic field sensor, is known, for example, from DE 10 2014 010 601 A1. The second magnetic field sensor is formed as a planar coil or as a toroidal coil and is arranged outside the magnetic field of the permanent magnet in a sensing plane, the surface normal of which is aligned perpendicularly to the magnetic field component of the permanent magnet detected by the first magnetic field sensor.

SUMMARY

In view of the great effort required for shielding or in view of a specific sensor for detecting the presence of an external magnetic interference field, the present disclosure is based on the object of providing a sensor arrangement for an automated transmission of the type mentioned at the outset, with which such an external magnetic interference field can be ascertained without additional equipment. The present disclosure is also based on the object of providing a method for ascertaining an external magnetic interference field by way of a sensor arrangement of this type.

The device-related object is achieved by a sensor arrangement as described herein, while the method-related problem is achieved by a method having the features described herein. Advantageous developments of the method are described throughout the present disclosure.

Accordingly, the present disclosure relates to a sensor arrangement for an automated transmission, which has a shifting device that includes multiple shift rails, which are arranged so as to be axially parallel to one another and are axially displaceable by way of associated shift actuators, wherein the sensor arrangement has multiple displacement sensors, each of which is made up of a signal transmitter attached to one of the shift rails and a signal receiver fixedly arranged on a housing, wherein the signal transmitters are each in the form of a permanent magnet, wherein the signal receivers are each in the form of a 3D Hall sensor, and in which the signal receivers are connected to an electronic transmission control unit via electrical sensor lines.

As the solution to the device-related problem, it is provided with respect to this sensor arrangement that the signal transmitters are arranged having an identical axial alignment of their magnetic poles N, S, and that the signal receivers are arranged in a common plane that is horizontal in their installation position.

An external magnetic interference field can be located laterally with respect to the vehicle, above the vehicle, or below the vehicle, the external magnetic interference field being generated, for example, by heavy-current cables, which are laid at a wall or in the floor of a warehouse. It is also possible, however, that an external magnetic interference field is generated by a lifting magnet that is attached at a crane jib and located above the vehicle. Due to the small distance between the displacement sensors and assuming that the strength or the magnetic flux density of the interference field is constant at a certain height above the ground, it is ensured that the interference signals detected by the Hall sensors largely have identical intensities and time profiles due to the identical axial alignment of the magnetic poles (N, S) of the permanent magnets and due to the arrangement of the permanent magnets and the 3D Hall sensors in a common plane, which is horizontal in the installation position. Therefore, evaluating the sensor signals of all Hall sensors enables the detection of the presence of a strong magnetic interference field, due to which the position information of the Hall sensors can become corrupted.

Moreover, the present disclosure relates to a method for ascertaining an external magnetic interference field by way of a sensor arrangement for an automated transmission, which has a shifting device that includes multiple shift rails, which are arranged so as to be axially parallel to one another and are axially displaceable by way of associated shift actuators. The sensor arrangement has multiple displacement sensors, each of which is made up of a signal transmitter attached to one of the shift rails and a signal receiver fixedly arranged on a housing. The signal transmitters are each in the form of a permanent magnet and the signal receivers are each in the form of a 3D Hall sensor. The signal receivers are connected to an electronic transmission control unit via electrical sensor lines. In addition, the signal transmitters are arranged having an identical axial alignment of their magnetic poles, for example (N, S), and wherein the signal receivers are arranged in a common plane that is horizontal in their installation position.

As a solution to the method-related problem, it is provided according to the present disclosure that the sensor signals of the signal receivers are detected at a fixed interval $\Delta t_S$ and their current signal values $x_S$ are stored, and that the presence of an external magnetic interference field is detected due to the fact that the signal values $x_S$ of at least two signal receivers simultaneously have a signal value change, even though a gear change operation of the transmission was not triggered in advance. The interval $\Delta t_S$ can be, for example, a few milliseconds up to a few hundred milliseconds.

An external magnetic interference field can arise in five operating situations of a vehicle:
  The vehicle, with the vehicle electrical system switched on, is located in the range of an inactive magnetic interference field and the magnetic interference field is switched on.
  The vehicle, with the vehicle electrical system switched off, is located in the range of an active magnetic interference field and the vehicle electrical system is switched on.
  The vehicle drives into an active magnetic interference field.
  The vehicle passes through an active magnetic interference field.

The vehicle, with the vehicle electrical system switched on, is located in the range of an inactive magnetic interference field and the magnetic interference field is switched on and then switched off.

Because the actuating speed of the shift rails of the transmission is considerably higher than the ground speed of a vehicle, which is at most 30 km/h, in the proximity of loading points that could have such interference fields, a signal value change in the sensor signals can be unambiguously differentiated from a change in a sensor signal due to a gear change operation or a selection operation. The passage through or the switching on and off of a magnetic interference field can also be detected on the basis of the time profiles of the sensor signals.

For the assessment of the signal value change in the sensor signals, it is provided in a development of the aforementioned method that a mean value $x_{S\_M}$ of the most recently detected signal values $x_S$ is formed for each signal receiver, an inner tolerance range of the signal values $\Delta x_{S\_T}$ about the particular mean value $x_{S\_M}$ is defined, and an outer interference range of the signal values $\Delta x_{S\_S}$ about the particular mean value $x_{S\_M}$ is established, and an observation time period $\Delta t_B$ including the particular most recently detected sensor signal is established. The width of the tolerance range $\Delta x_{S\_T}$ corresponds, in this exemplary embodiment, in each direction to the strength or the magnetic flux density of a magnetic interference field that is tolerable by the signal receivers, which is +/−4 mT in this case. The width of the interference range $\Delta x_{S\_S}$ corresponds, in this exemplary embodiment, in each direction from the mean value $x_{S\_M}$ to the maximally assumed strength or magnetic flux density of an external magnetic interference field of +/−25 mT in this case, and the observation period $\Delta t_B$ preferably has the length of a single-digit second range ($\Delta t_B$=1 second to 9 seconds).

The presence of a magnetic interference field that is critical relative to a proper functioning of the shifting device is evaluated as having been detected when a gear change operation of the transmission has not been triggered, the sensor signals $x_{S1}(t)$, $x_{S2}(t)$, $x_{S3}(t)$, $x_{S4}(t)$ of all signal receivers have exceeded or fallen below the tolerance range $\Delta x_{S\_T}$ at the beginning t1 and at the end t2 of the observation period $\Delta t_B$ and have remained within the aforementioned interference range $\Delta x_{S\_S}$.

By comparison, the presence of a magnetic interference field that is critical relative to a proper functioning of the shifting device is considered not to have been detected when a gear change operation of the transmission has not been triggered, the sensor signals $x_{S1}(t)$, $x_{S2}(t)$, $x_{S3}(t)$, $x_{S4}(t)$ of all signal receivers have exceeded or fallen below the tolerance range $\Delta x_{S\_T}$ at the beginning t1 of the observation period $\Delta t_B$ and, thereafter, have remained within the interference range $\Delta x_{S\_S}$, but the sensor signal $x_{S2}(t)$ of at least one signal receiver has re-entered the tolerance range $\Delta x_{S\_T}$ within the observation period $\Delta t_B$. The latter signal curve corresponds, for example, to the traversing of a heavy-current cable, which is laid in or on the floor, by the vehicle, which can be considered to be non-critical, however, due to the short acting time of the magnetic interference field.

Similarly, the presence of a magnetic interference field that is critical relative to a proper functioning of the shifting device is considered not to have been detected when the sensor signals $x_{S1}(t)$, $x_{S2}(t)$, $x_{S3}(t)$, $x_{S4}(t)$ of all signal receivers have exceeded or fallen below the tolerance range $\Delta x_{S\_T}$ at the beginning t1 of the observation period $\Delta t_B$, but the sensor signal $x_{S2}(t)$ of at least one signal receiver has exited the interference range $\Delta x_{S\_S}$ within the observation period $\Delta t_B$ due to a shift request of the transmission that has occurred in the meantime. This signal curve corresponds to a gear change operation in which the associated shift rail is axially displaced, which is also detected by the electronic transmission control unit due to the activation of the associated shift actuator.

Upon detection of a magnetic interference field having field strength that is suitable for possibly corrupting the sensor signals of the signal receivers, responses can take on different forms. In this way, the updating of the signal values can be suppressed or a gear shift of the transmission can be prevented. It is also possible that, in this case, only the gear shift of the transmission into a certain forward gear and/or a certain reverse gear is permitted in order to make it possible to leave the magnetic interference field, wherein, in this gear shift, the sensor signals of the signal receivers are not accessed, but rather the shift control is carried out for shifting time periods that are generous for a gear shift of this type.

BRIEF DESCRIPTION OF THE DRAWINGS

Drawings with an exemplary embodiment accompanies the description to further illustrate the present disclosure. In the drawings.

DETAILED DESCRIPTION

Figure 1:
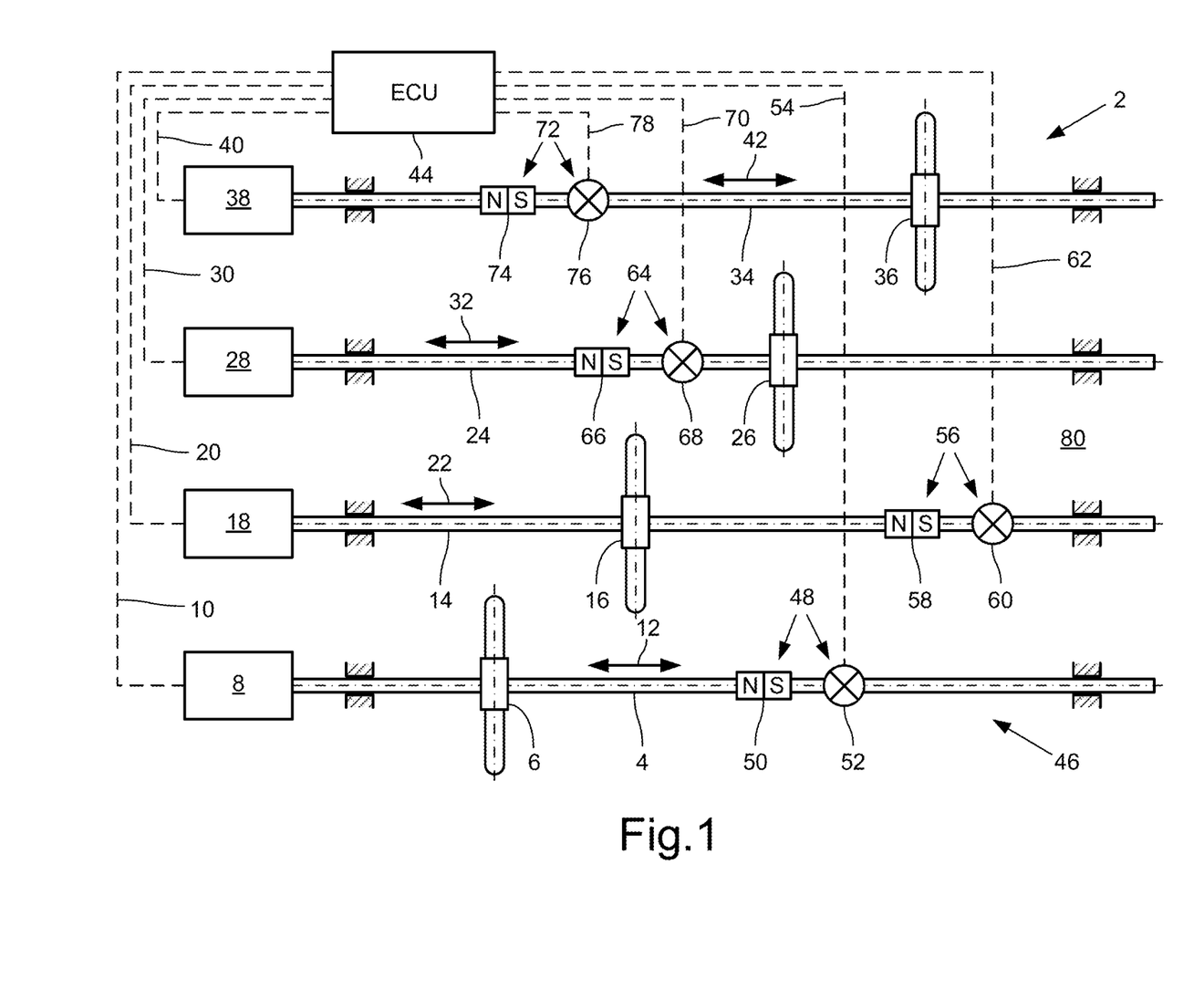
FIG. 1 is a schematic top view of a shifting device of an automated transmission that includes four shift rails and a sensor arrangement according to the invention that includes four displacement sensors.
Figure 2A:
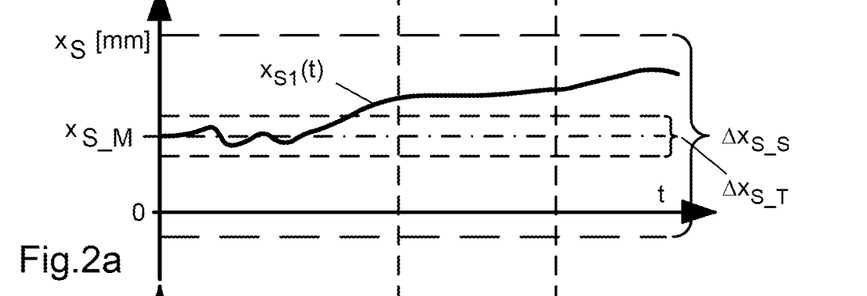
FIGS. 2a through 2d show first profiles of the sensor signals of the four displacement sensors according to FIG. 1 for ascertaining an external magnetic interference field.
Figure 2B:
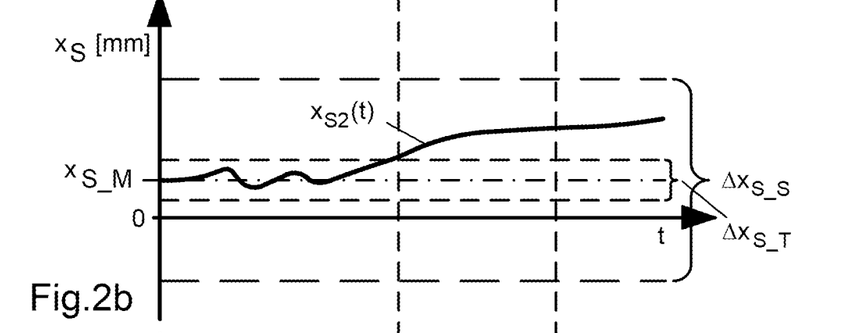
Figure 2C:
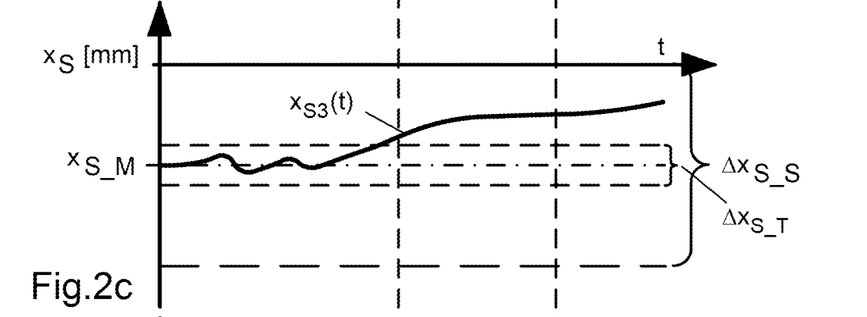
Figure 2D:
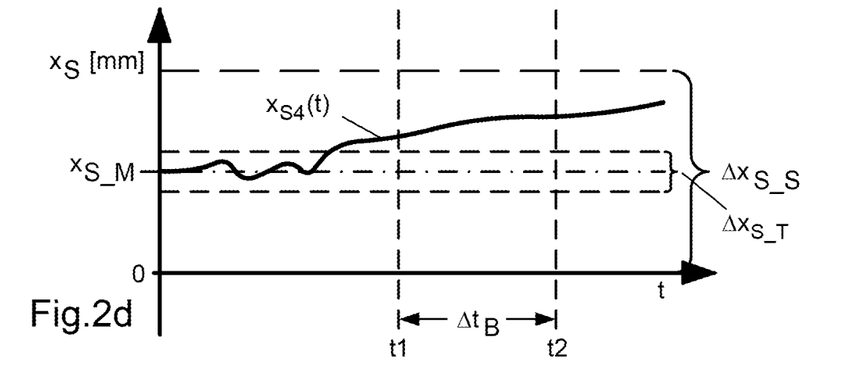

FIG. 1 shows a schematic top view of the shifting device 2 of an automated transmission of a countershaft design. The transmission is designed as a group transmission and includes a four-stage main transmission, a two-stage splitter group connected upstream from the main transmission, and a two-stage range change group connected downstream from the main transmission.

A first shift rail 4 is associated with the splitter group, the first shift rail 4 being arranged so as to be axially parallel to the transmission shafts (not shown) and is mounted in a transmission housing (not shown in greater detail) so as to be axially movable according to the first double-direction arrow 12. A first shift fork 6 is rigidly fixed on the first shift rail 4, the first shift fork 6 engaging, in a manner which is not shown, into a gear shift sleeve, which is guided on a transmission shaft in a rotationally fixed and axially displaceable manner. Due to an axial displacement of the first shift rail 4 and, thereby, of the associated gear shift sleeve, a change-over between two gear stages of the splitter group can be carried out. For this purpose, the first shift rail 4 is in an actuating connection with a first shift actuator 8, which is connected to an electronic transmission control unit 44 via a first electrical control line 10. The shift actuator 8 can be a hydraulic or pneumatic piston-cylinder arrangement, the pressure chambers of which are pressurizable with a pressure medium or are depressurizable via solenoid valves. An electric motor-operated or electromagnetic design of the first shift actuator 8 and also of all further shift actuators 18, 28, 38 is also possible, however.

A second and a third shift rail 14, 24, respectively, are associated with the main transmission, the second and the third shift rails 14, 24 being arranged so as to be axially parallel to each other and to the transmission shafts and to the first shift rail 4 of the splitter group. These two shift rails 14, 24 are mounted in the transmission housing so as to be axially movable according to the second and the third double-direction arrows 22, 32, respectively. A shift fork 16, 26 is rigidly fixed on each of these two shift rails 14, 24, respectively, the shift forks 16, 26 each engaging, in a manner which is not shown, into a gear shift sleeve, which is guided on a transmission shaft in a rotationally fixed and axially displaceable manner. Due to an axial displacement of one of these two shift rails 14, 24 in each case and, thereby, of the gear shift sleeve engaged with the associated shift fork 16, 26, a change-over can be carried out in each case between the shift positions of two gear stages of the main transmission and a neutral position, in which both gear stages are disengaged. For this purpose, the second and the third shift rails 14, 24, respectively, are in an actuating connection with an associated second and third shift actuator 18, 28, respectively, which are connected to the electronic transmission unit 44 via an electrical control line 20, 30, respectively.

A fourth shift rail 34 is associated with the range change group of the group transmission, the fourth shift rail 34 being arranged so as to be axially parallel to the transmission shafts and to the three other shift rails 4, 14, 24 and is mounted in the transmission housing so as to be axially movable according to the fourth double-direction arrow 42. A fourth shift fork 36 is rigidly fixed on the fourth shift rail 34, the fourth shift fork 36 engaging, in a manner which is not shown, into a gear shift sleeve, which is guided on a transmission shaft in a rotationally fixed and axially displaceable manner. Due to an axial displacement of the fourth shift rail 34 and, thereby, of the associated gear shift sleeve, a change-over between two gear stages of the range change group can be carried out. For this purpose, the fourth shift rail 34 is in an actuating connection with a fourth shift actuator 38, which is connected to the electronic transmission control unit 44 via an electrical control line 40.

An associated sensor arrangement 46 includes four displacement sensors 48, 56, 64, 72. These displacement sensors 48, 56, 64, 72 are each made up of a signal transmitter 50, 58, 66, 74, respectively, which is attached to one of the four shift rails 4, 14, 24, 34, respectively, and is in the form of a permanent magnet, and a signal receiver 52, 60, 68, 76, which is fixedly arranged on the housing and is in the form of a 3D Hall sensor. The signal receivers 52, 60, 68, 76 are connected to the electronic transmission control unit 44 via associated electrical sensor lines 54, 62, 70, 78, respectively.

According to the invention, signal transmitters 50, 58, 66, 74 in the form of permanent magnets are arranged having an identical axial alignment of their magnetic poles N, S, and the signal receivers 52, 60, 68, 76 in the form of 3D Hall sensors are arranged in a common plane 80 that is horizontal in their installation position. In FIG. 1, this horizontal plane 80 corresponds to the plane of the drawing. Due to the arrangement of the displacement sensors 48, 56, 64, 72 according to the present disclosure, an external magnetic interference field largely identically affects all four signal receivers 52, 60, 68, 76 or 3D Hall sensors, and so the presence of a strong magnetic interference field, due to which the actuating position signals of the signal receivers 52, 60, 68, 76 can become corrupted, can be detected by evaluating the sensor signals $x_{S1}$, $x_{S2}$, $x_{S3}$, $x_{S4}$ of all signal receivers 52, 60, 68, 76.

The sensor signals $x_{S1}$, $x_{S2}$, $x_{S3}$, $x_{S4}$ of the signal receivers 52, 60, 68, 76 designed as 3D Hall sensors are detected in the form of the particular sensed actuating position at a fixed interval $\Delta t_S$ and stored as a current signal value $x_{S\_akt}$ of each Hall sensor 52, 60, 68, 76, respectively. The presence of an external magnetic interference field is detected due to the fact that the most recently detected sensor signals $x_S$ of all signal receivers 52, 60, 68, 76 simultaneously have a signal value change without the presence of an active shift request or a transmission shift that is currently underway. Because the actuating speed of the shift rails 4, 14, 24, 34 is considerably higher than the ground speed of a vehicle in the proximity of loading points, which is at most 30 km/h, a signal value change in the sensor signals $x_{S1}$, $x_{S2}$, $x_{S3}$, $x_{S4}$ can be clearly differentiated from a change in a sensor signal due to a gear change operation or a selection operation. The passage through or the switching on and off of a magnetic interference field can also be detected on the basis of the time profiles of the sensor signals $x_S(t)$.

For this purpose, it is provided that a mean value $x_{S\_M}$ of the most recently detected sensor signals $x_S$ is formed for assessing the signal value change in the sensor signals $x_S(t)$ of each signal receiver 52, 60, 68, 76. An inner tolerance range $\Delta x_{S\_T}$ and an outer interference range $\Delta x_{S\_S}$ about the particular mean value $x_{S\_M}$ are defined for the sensor signals $x_S(t)$. The values of the inner tolerance range $\Delta x_{S\_T}$ are lower than the values of the outer interference range $\Delta x_{S\_S}$. In addition, an observation period $\Delta t_B$ including the particular most recently detected sensor signal $x_S$ is established.

The width of the tolerance range $\Delta x_{S\_T}$ corresponds in each direction to the strength or magnetic flux density of a magnetic interference field that is tolerable by the signal receivers 52, 60, 68, 76, which is, for example, +1-4 mT in the present case. The width of the interference range $\Delta x_{S\_S}$ corresponds in each direction to the maximally assumed strength or magnetic flux density of an external magnetic interference field of, for example, +1-25 mT in the present case. The observation period $\Delta t_B$ is defined as a single-digit second range and can be between 1 second and 9 seconds in this exemplary embodiment.

The assessment of the time profiles of the sensor signals $x_{S1}(t)$, $x_{S2}(t)$, $x_{S3}(t)$, $x_{S4}(t)$ of the four signal receivers 52, 60, 68, 76 in the form of 3D Hall sensors with respect to the presence of a magnetic interference field is described in the following with reference to three examples shown in FIGS. 2a, 2b, 2c, 2d; 3a, 3b, 3c, 3d; 4a, 4b, 4c, 4d.

In the first example shown in FIGS. 2a, 2b, 2c, 2d, it is apparent that the signal values $x_S$ of the sensor signals $x_{S1}(t)$, $x_{S2}(t)$, $x_{S3}(t)$, $x_{S4}(t)$ of all four signal receivers 52, 60, 68, 76 in the form of 3D Hall sensors have exceeded the inner tolerance range $\Delta x_{S\_T}$ at the beginning of the observation period $\Delta t_B$ (point in time t1) and at the end of the observation period $\Delta t_B$ (point in time t2) and have remained within the external interference range $\Delta x_{S\_S}$. Due to the largely identical signal value change detected in all time profiles of the sensor signals $x_{S1}(t)$, $x_{S2}(t)$, $x_{S3}(t)$, $x_{S4}(t)$ and the absence of an active shift request, the presence of a critical external magnetic interference field is detected in this case.

Figure 3A:
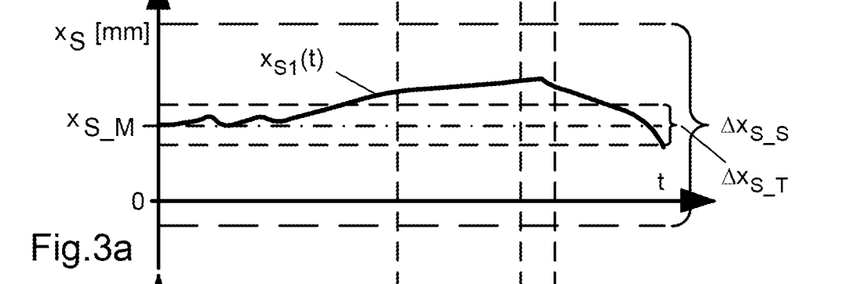
FIGS. 3a through 3d show second profiles of the sensor signals of the four displacement sensors according to FIG. 1 for ascertaining an external magnetic interference field.
Figure 3B:
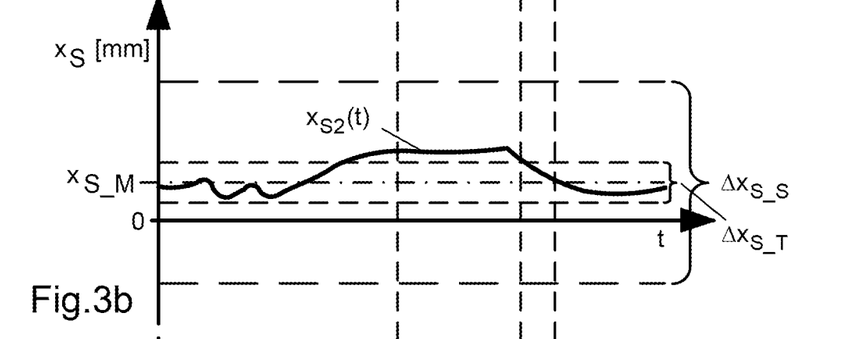
Figure 3C:
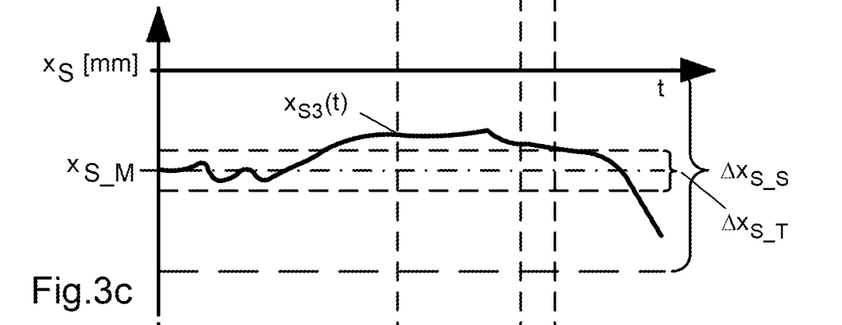
Figure 3D:
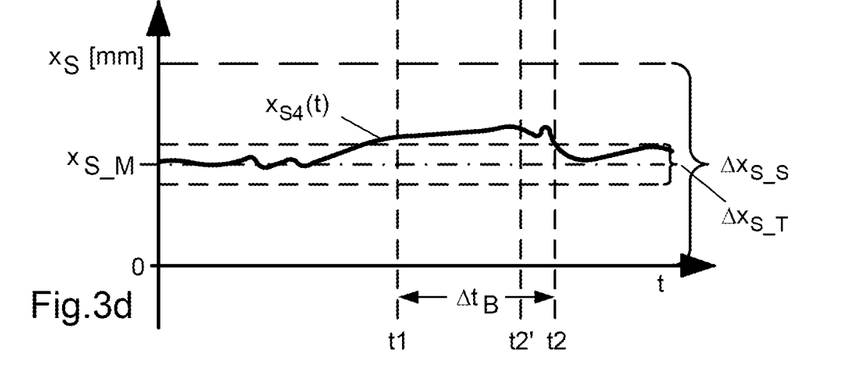

In the second example shown in FIGS. 3a, 3b, 3c, 3d, it is apparent that the signal values $x_S$ of the sensor signals $x_{S1}(t)$, $x_{S3}(t)$, $x_{S4}(t)$ of the first, the third, and the fourth signal receivers 52, 68, 76, respectively, according to FIGS. 3a, 3c, 3d have exceeded the inner tolerance range $\Delta x_{S\_T}$ at the beginning of the observation period $\Delta t_B$ (point in time t1)

and at the end of the observation period $\Delta t_B$ (point in time t2) and have remained within the outer interference range $\Delta x_{S\_S}$. By comparison, the signal values $x_S$ of the sensor signal $x_{S2}(t)$ of the second signal receiver 60 according to FIG. 3b have in fact exceeded the inner tolerance range $\Delta x_{S\_T}$ at the beginning of the observation period $\Delta t_B$ (point in time t1), however, the signal values $x_S$ of the sensor signal $x_{S2}(t)$ of the second signal receiver 60 have re-entered the tolerance range $\Delta x_{S\_T}$ at the point in time t2' prior to the end of the observation period $\Delta t_B$. Because an active shift request is not present and the time profile of the sensor signal $x_{S2}(t)$ of the second signal receiver 60 permits the inference of an only short-term influence of the sensor signals $x_{S1}(t)$, $x_{S2}(t)$, $x_{S3}(t)$, $x_{S4}(t)$ of all signal receivers 52, 60, 68, 76, the presence of a critical external magnetic interference field can be assessed in this case as not having been detected.

Figure 4A:
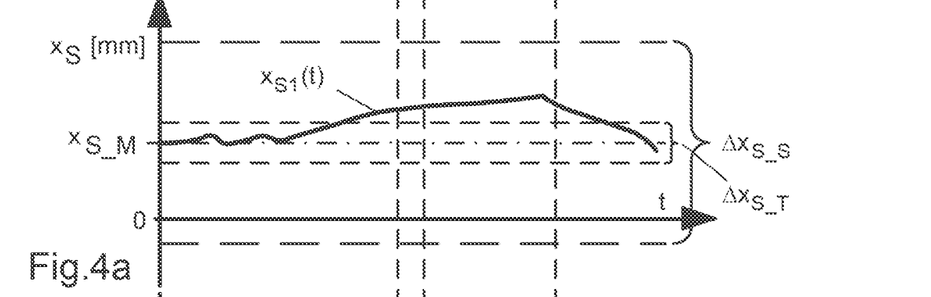
FIGS. 4a through 4d show third profiles of the sensor signals of the four displacement sensors according to FIG. 1 for ascertaining an external magnetic interference field.
Figure 4B:
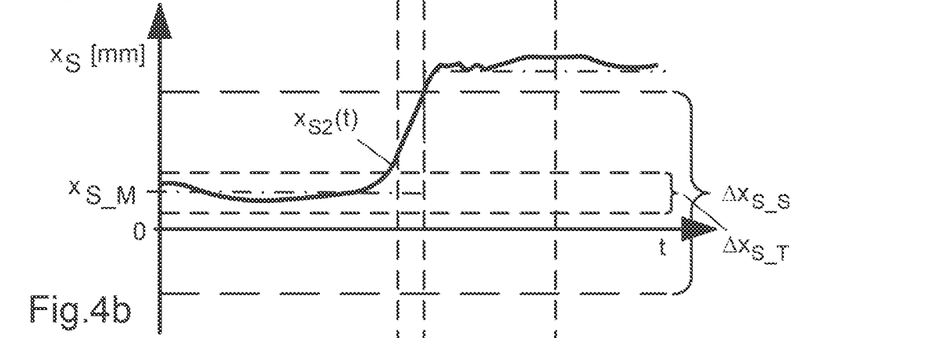
Figure 4C:
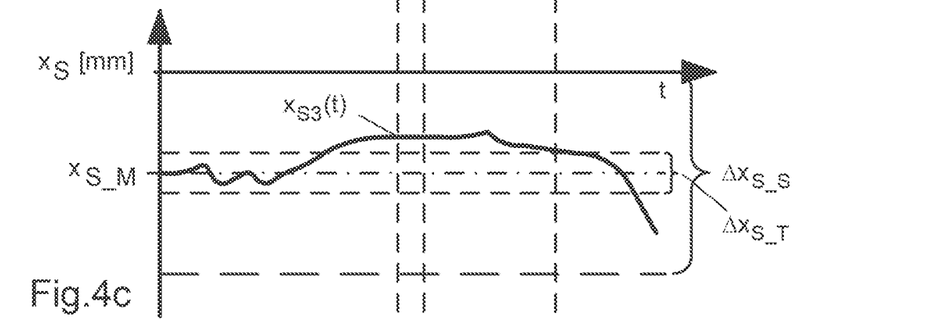
Figure 4D:
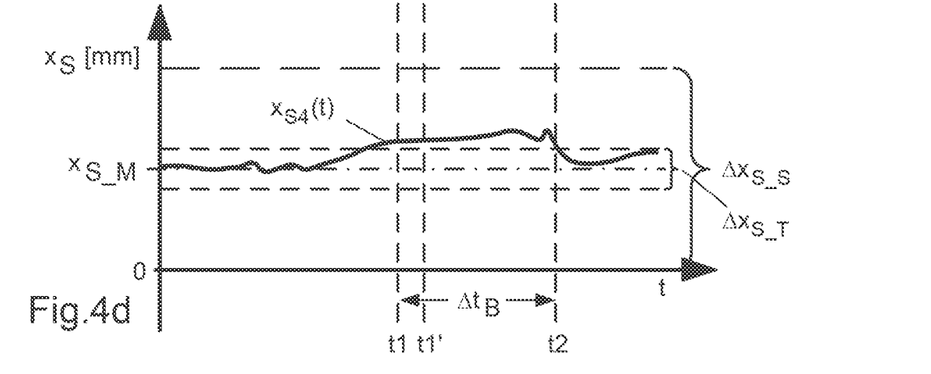

In the third example shown in FIGS. 4a, 4b, 4c, 4d, it is apparent that the signal values $x_S$ of the sensor signals $x_{S1}(t)$, $x_{S3}(t)$, $x_{S4}(t)$ of the first, the third, and the fourth signal receivers 52, 68, 76, respectively, according to FIGS. 4a, 4c, 4d have exceeded the inner tolerance range $\Delta x_{S\_T}$ at the beginning of the observation period $\Delta t_B$ (point in time t1) and at the end of the observation period $\Delta t_B$ (point in time t2) and have remained within the outer interference range $\Delta x_{S\_S}$. By comparison, according to FIG. 4b, the signal values $x_S$ of the sensor signal $x_{S2}(t)$ of the second signal receiver 60 have in fact exceeded the inner tolerance range $\Delta x_{S\_T}$ at the beginning of the observation period $\Delta t_B$ (point in time t1) but, shortly thereafter, at the point in time t1', have exceeded the outer interference range $\Delta x_{S\_S}$ due to a shift request or transmission shift that has occurred in the meantime. Therefore, the presence of a critical magnetic interference field is also considered not to have been detected in this case.

LIST OF REFERENCE SIGNS (PART OF THE DESCRIPTION)

2 shifting device
4 first shift rail
6 first shift fork
8 first shift actuator
10 control line
12 first double-direction arrow
14 second shift rail
16 second shift fork
18 second shift actuator
20 control line
22 second double-direction arrow
24 third shift rail
26 third shift fork
28 third shift actuator
30 control line
32 third double-direction arrow
34 fourth shift rail
36 fourth shift fork
38 fourth shift actuator
40 control line
42 fourth double-direction arrow
44 electronic transmission control unit, ECU
46 sensor arrangement
48 first displacement sensor
50 first signal transmitter, permanent magnet
52 first signal receiver, 3D Hall sensor
54 sensor line
56 second displacement sensor
58 second signal transmitter, permanent magnet
60 second signal receiver, 3D Hall sensor
62 sensor line
64 third displacement sensor
66 third signal transmitter, permanent magnet
68 third signal receiver, 3D Hall sensor
70 sensor line
72 fourth displacement sensor
74 fourth signal transmitter, permanent magnet
76 fourth signal receiver, 3D Hall sensor
78 sensor line
80 horizontal plane
N magnetic north pole
S magnetic south pole
t time
t1, t2 points in time
t1', t2' points in time
$\Delta t_B$ observation period
$\Delta t_S$ interval
$x_S$ signal values of a sensor signal; signal values
$x_S(t)$ time profile of a sensor signal
$x_{S1}(t)$ time profile of the sensor signal of the first signal receiver
$x_{S2}(t)$ time profile of the sensor signal of the second signal receiver
$x_{S3}(t)$ time profile of the sensor signal of the third signal receiver
$x_{S4}(t)$ time profile of the sensor signal of the fourth signal receiver
$x_{S\_akt}$ current signal value
$x_{S\_M}$ mean value of the signal values
$\Delta x_{S\_T}$ tolerance range of the signal values
$\Delta x_{S\_S}$ interference range of the signal values

The invention claimed is:

1. A sensor arrangement (46) for an automated transmission, comprising:
    a shifting device (2) including multiple shift rails (4, 14, 24, 34), which are arranged so as to be axially parallel to one another and which are axially displaceable by associated shift actuators (8, 18, 28, 38),
    wherein the sensor arrangement (46) includes multiple displacement sensors (48, 56, 64, 72),
    wherein each of the displacement sensors comprises a signal transmitter (50, 58, 66, 74) attached to one of the shift rails (4, 14, 24, 34) and a signal receiver (52, 60, 68, 76) fixedly arranged on a housing,
    wherein the signal transmitters (50, 58, 66, 74) are each in the form of a permanent magnet having magnetic poles,
    wherein the signal receivers (52, 60, 68, 76) are each in the form of a 3D Hall sensor, and
    wherein the signal receivers (52, 60, 68, 76) are each connected to an electronic transmission control unit (44) via electrical sensor lines (54, 62, 70, 78),
    wherein the signal transmitters (50, 58, 66, 74) are arranged having an identical axial alignment of their magnetic poles (N, S), and
    wherein the signal receivers (52, 60, 68, 76) are arranged in a common plane (80) that is horizontal in an installation position of the signal receivers;
    wherein the electronic control unit receives signal values from the signal transmitters during an observation period, wherein the electronic control unit receives data corresponding to whether a gear change operation has been triggered during the observation period.

2. The sensor arrangement of claim 1, wherein the electronic control unit determines a presence of a magnetic interference field having a field strength above a threshold field strength in response to detecting that the signal values ($x_S$) of at least two signal receivers (52, 60, 68, 76) simultaneously have a signal value change at a time when a gear change operation of the transmission has not been triggered.

3. The sensor arrangement of claim 1, wherein the multiple shift rails comprise four shift rails, wherein one of the shift rails is associated with a two-stage splitter group connected upstream of a main transmission, two of the shift rails are associated with the main transmission, and one of the shift rails is associated with a two-stage range change group connected downstream from the main transmission.

4. The sensor arrangement according to claim 1, wherein each of the shift rails includes a shift fork rigidly mounted thereto and axially displaceable therewith.

5. The sensor arrangement according to claim 4, wherein the shift rails, shift forks, and signal transmitters move axially relative to the signal receivers that remain fixed in place.

6. The sensor arrangement according to claim 1, wherein the signal receivers are located at different axial positions relative to each other within the common plane.

7. The sensor arrangement according to claim 1, wherein an external magnetic field substantially identically affects all of the signal receivers.

8. The sensor arrangement according to claim 1, wherein each of the signal receivers detects an actuating position of the associated signal transmitters.

9. A method for ascertaining an external magnetic interference field by a sensor arrangement (46) for an automated transmission having a shifting device (2) including multiple shift rails (4, 14, 24, 34) arranged axially parallel to one another and being axially displaceable by associated shift actuators (8, 18, 28, 38), wherein the sensor arrangement (46) has multiple displacement sensors (48, 56, 64, 72), each of which comprises a signal transmitter (50, 58, 66, 74) attached to one of the shift rails (4, 14, 24, 34) and a signal receiver (52, 60, 68, 76) fixedly arranged on a housing, wherein the signal transmitters (50, 58, 66, 74) are each in the form of a permanent magnet having magnetic poles, wherein the signal receivers (52, 60, 68, 76) are each in the form of a 3D Hall sensor, and wherein the signal receivers (52, 60, 68, 76) are connected to an electronic transmission control unit (44) via electrical sensor lines (54, 62, 70, 78),
wherein the signal transmitters (50, 58, 66, 74) are arranged having an identical axial alignment of their magnetic poles (N, S), and wherein the signal receivers (52, 60, 68, 76) are arranged in a common plane (80) that is horizontal in an installation position of the signal receivers,
the method comprising the steps of:
detecting sensor signals of each of the signal receivers (52, 60, 68, 76) at a fixed interval ($\Delta t_S$);
storing current signal values ($x_S$) of the sensor signals, and determining a presence of an external magnetic interference field in response to detecting that the signal values ($x_S$) of at least two signal receivers (52, 60, 68, 76) simultaneously have a signal value change at a time when a gear change operation of the transmission has not been triggered.

10. The method as claimed in claim 9,
wherein a mean value ($x_{S\_M}$) of the most recently detected signal values ($x_S$) is formed for assessing the change of the signal values ($x_S$) of each signal receiver (52, 60, 68, 76),
wherein an inner tolerance range of the signal values ($\Delta x_{S\_T}$) about the particular mean value ($x_{S\_M}$) is defined,
wherein an outer interference range of the signal values ($\Delta x_{S\_S}$) about the particular mean value ($x_{S\_M}$) is established,
wherein an observation period ($\Delta t_B$) including the particular most recently detected sensor signal is established,
wherein a width of the inner tolerance range ($\Delta x_{S\_T}$) in each direction from the mean value corresponds to a particular strength of a magnetic interference field of +/−4 Millitesla that is tolerable by the signal receivers (52, 60, 68, 76),
wherein a width of the outer interference range ($\Delta x_{S\_S}$) in each direction from the mean value ($x_{S\_M}$) corresponds to a maximally assumed strength of an external magnetic interference field of +/−25 Millitesla, and
wherein an observation period ($\Delta t_B$) is defined as a single-digit second range.

11. The method as claimed in claim 9, further comprising:
detecting, at a time when a gear change operation of the transmission has not been triggered, that the sensor signals ($x_{S1}(t)$, $x_{S2}(t)$, $x_{S3}(t)$, $x_{S4}(t)$) of all signal receivers (52, 60, 68, 76) have exceeded or fallen below an inner tolerance range ($\Delta x_{S\_T}$) at a beginning (t1) and at an end (t2) of an observation period ($\Delta t_B$) and have remained within an outer interference range ($\Delta x_{S\_S}$); and
in response thereto, detecting a magnetic interference field that is detrimental relative to a proper functioning of the shifting device (2).

12. The method as claimed in claim 9, further comprising:
detecting, at a time when a gear change operation of the transmission has not been triggered, that the sensor signals ($x_{S1}(t)$, $x_{S2}(t)$, $x_{S3}(t)$, $x_{S4}(t)$) of all signal receivers (52, 60, 68, 76) have exceeded or fallen below an inner tolerance range ($\Delta x_{S\_T}$) at a beginning (t1) of an observation period ($\Delta t_B$) and, thereafter, have remained within an outer interference range ($\Delta x_{S\_S}$), which range is greater than the inner interference range,
detecting that the sensor signal ($x_{S2}(t)$) of at least one signal receiver (60) has re-entered the inner tolerance range ($\Delta x_{S\_T}$) within the observation period ($\Delta t_B$), and
in response thereto, determining that a magnetic interference field that is detrimental relative to a proper functioning of the shifting device (2) is not present.

13. The method as claimed in claim 9, further comprising:
detecting, at a time when a gear change operation of the transmission has not been triggered, that the sensor signals ($x_{S1}(t)$, $x_{S2}(t)$, $x_{S3}(t)$, $x_{S4}(t)$) of all signal receivers (52, 60, 68, 76) have exited an inner tolerance range ($\Delta x_{S\_T}$) at a beginning (t1) of an observation period ($\Delta t_B$),
detecting, at a time when a shift request has occurred after the beginning of the observation period, that the sensor signal ($x_{S2}(t)$) of at least one signal receiver (60) has exited an outer interference range ($\Delta x_{S\_S}$), which range is greater than the inner interference range, within the observation period ($\Delta t_B$), and
in response thereto, determining that a magnetic interference field that is detrimental critical relative to a proper functioning of the shifting device (2) is not present but the sensor signal ($x_{S2}(t)$) of at least one signal receiver (60) has exited the interference range ($\Delta x_{S\_S}$) within the observation period ($\Delta t_B$) due to a shift request that has occurred in the meantime.

14. The method as claimed in claim 9, further comprising, in response to detection of a magnetic interference field above a threshold field strength, due to which the sensor signals of the signal receivers (52, 60, 68, 76) could be corrupted, suppressing updating of the signal values.

15. The method as claimed in claim 9, further comprising, in response to detection of a magnetic interference field above a threshold field strength, due to which the sensor signals of the signal receivers (52, 60, 68, 76) could be corrupted, preventing a gear shift of the transmission.

16. The method as claimed in claim 9, further comprising, in response to detection of a magnetic interference field above a threshold field strength, due to which the sensor signals of the signal receivers (52, 60, 68, 76) could be corrupted, only permitting a gear shift of the transmission (2) into a predetermined forward gear and/or a predetermined reverse gear in order to make it possible to leave the magnetic interference field, wherein, in this gear shift, the sensor signals of the signal receivers (52, 60, 68, 76) are not accessed, and shift control is carried out for shifting time periods that are above a predetermined time period for a gear shift of this type.

17. A sensor arrangement (46) for an automated transmission, comprising:
- a shifting device (2) including multiple shift rails (4, 14, 24, 34), which are arranged so as to be axially parallel to one another and which are axially displaceable by associated shift actuators (8, 18, 28, 38),
- wherein the sensor arrangement (46) includes multiple displacement sensors (48, 56, 64, 72),
- wherein each of the displacement sensors comprises a signal transmitter (50, 58, 66, 74) attached to one of the shift rails (4, 14, 24, 34) and a signal receiver (52, 60, 68, 76) fixedly arranged on a housing,
- wherein the signal transmitters (50, 58, 66, 74) are each in the form of a permanent magnet having magnetic poles,
- wherein the signal receivers (52, 60, 68, 76) are each in the form of a 3D Hall sensor, and
- wherein the signal receivers (52, 60, 68, 76) are each connected to an electronic transmission control unit (44) via electrical sensor lines (54, 62, 70, 78),
- wherein the signal transmitters (50, 58, 66, 74) are arranged having an identical axial alignment of their magnetic poles (N, S), and
- wherein the signal receivers (52, 60, 68, 76) are arranged in a common plane (80) that is horizontal in an installation position of the signal receivers;
- wherein the ECU forms a mean value of the sensor signals and defines an inner tolerance range about the mean value and an outer interference range about the mean value that is greater than the inner tolerance range, and wherein the ECU establishes an observation period including a most recently detected sensor signal.

18. The sensor arrangement according to claim 17, wherein the inner tolerance range is +/−4 Millitesla and the outer tolerance range is +/−25 Millitesla.

19. The sensor arrangement according to claim 18, wherein the observation period is between 1 and 9 seconds.

* * * * *